April 19, 1955 G. A. SIMS 2,706,472
SUPERCHARGER FOR INTERNAL COMBUSTION ENGINE
Filed March 27, 1953 2 Sheets-Sheet 1

INVENTOR.
GEORGE A. SIMS
BY
McMorrow, Berman + Davidson
ATTORNEYS

April 19, 1955 G. A. SIMS 2,706,472
SUPERCHARGER FOR INTERNAL COMBUSTION ENGINE
Filed March 27, 1953 2 Sheets-Sheet 2

INVENTOR.
GEORGE A. SIMS
BY
McMorrow, Berman + Davidson
ATTORNEYS

United States Patent Office 2,706,472
Patented Apr. 19, 1955

2,706,472

SUPERCHARGER FOR INTERNAL COMBUSTION ENGINE

George A. Sims, Marianna, Fla.

Application March 27, 1953, Serial No. 345,012

3 Claims. (Cl. 123—119)

This invention relates to superchargers for internal combustion engines and more particularly to a supercharger assembly mounted on and driven by the associated engine and pneumatically between the carburetor and intake manifold of the engine.

It is among the objects of the invention to provide an improved internal combustion engine supercharger which is mounted directly on the associated engine, such as an automotive vehicle engine, and driven by the engine from the cooling fan, water pump or generator drive of the engine; which is pneumatically connected between the carbureor and intake manifold of the engine to force the combustible mixture from the carburetor under increased pressure into the intake manifold of the engine; which includes an operator-controlled clutch for placing the supercharger in and out of operation, as desired; which includes heat exchange means hydraulically connected to the liquid cooling system of the associated engine for regulating the temperature of the combustible charge passing through the supercharger; and which is simple and durable in construction, economical to manufacture, easy to install, and effective and efficient in operation.

Other objects and advantages will become apparent from a consideration of the following description and the appended claims in conjunction with the accompanying drawings, wherein:

Figure 1:
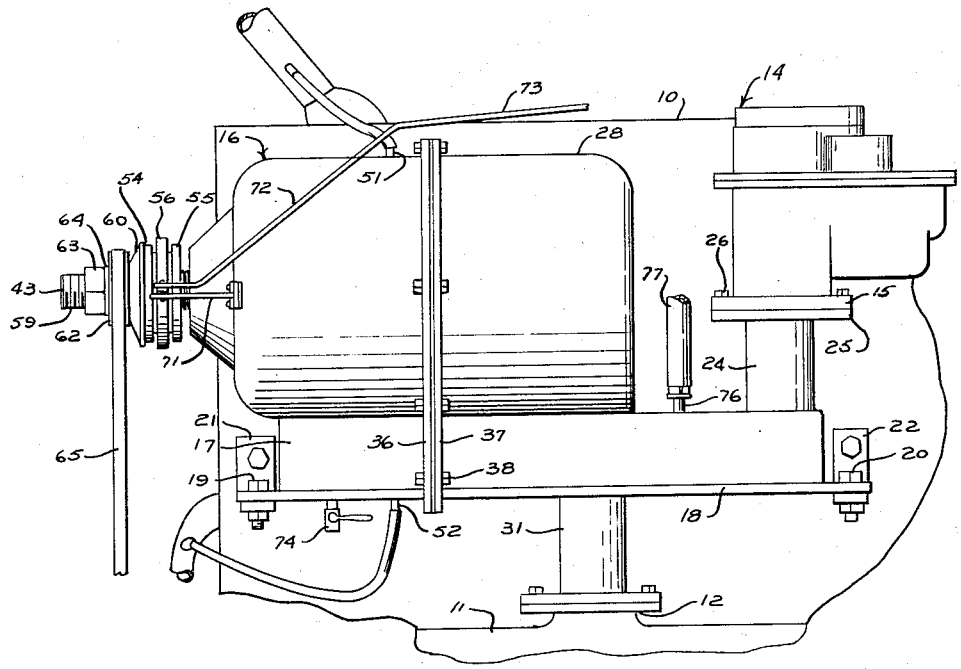
Figure 1 is a side elevational view of a supercharger illustrative of the invention with a carburetor operatively mounted on the supercharger.
Figure 2:
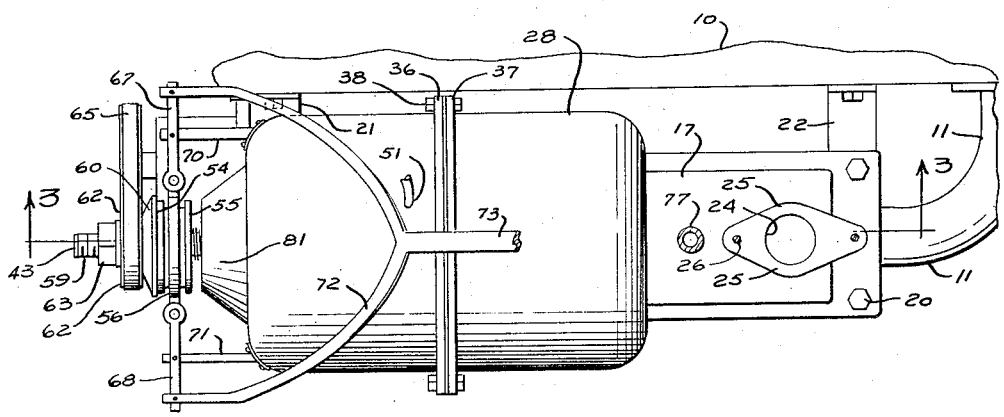
Figure 2 is a top plan view of the supercharger.
Figure 3:
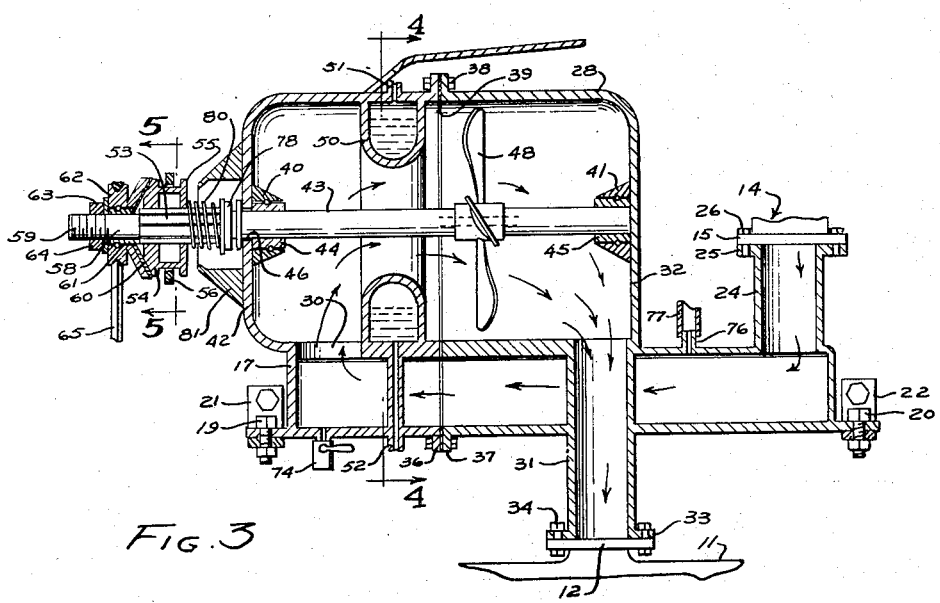
Figure 3 is a cross sectional view on the line 3—3 of Figure 2.
Figure 5:
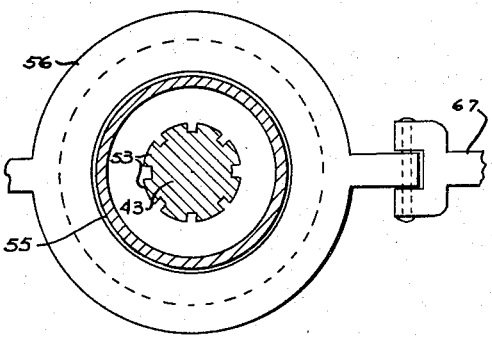
Figure 5 is a cross sectional view on the line 5—5 of Figure 3.
Figure 4:
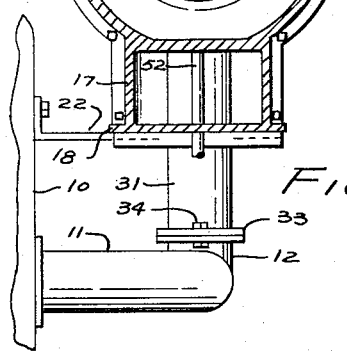
Figure 4 is a cross sectional view on the line 4—4 of Figure 3.

With continued reference to the drawings, the numeral 10 indicates an internal combustion engine having an intake manifold 11 provided with an apertured, flanged boss 12 for receiving the engine carburetor and the numeral 14 generally indicates a carburetor of known construction having at one end an annular flange 15 adapted to fit upon and to be secured to the intake manifold flange 12. The numeral 16 generally indicates an engine-driven supercharger pneumatically interposed between the carburetor 14 and the intake manifold 11 for increasing the intake manifold pressure of the engine and comprising a duct 17 of elongated, rectangular cross sectional shape having closed ends and an outwardly extending marginal flange 18 at one side thereof. The flange 18 is provided with apertures receiving bolts, as indicated at 19 and 20, which secure the supercharger to brackets, as indicated at 21 and 22, mounted on the associated engine 10.

A cylindrical conduit 24 extends perpendicularly from the side of the duct 17 remote from the flange side of the duct and at one end of the duct and has at its end remote from the duct 17 an outwardly extending, annular flange 25 on which the flange 15 of the carburetor 14 is disposed. The conduit 24 and the flange 25 together constitute a carburetor-receiving fitting projecting from the duct 17 and the flanges 15 and 25 are secured together by suitable means, such as the cap screws 26, a suitable gasket being preferably interposed between the abutting faces of these annular flanges.

A closed, hollow housing 28 is disposed on the duct 17 and is preferably of cylindrical shape with its longitudinal center line spaced from and parallel to the longitudinal center line of the duct. This housing has one end thereof spaced from the carburetor fitting 24 and its other end adjacent the end of the duct 17 remote from the fitting 24 and an aperture 30 is provided in the side of the duct adjacent the housing 28 to provide communication between the interior of the duct and the interior of the housing.

A cylindrical conduit 31 extends from the housing at a location adjacent the end wall 32 of the housing nearest the carburetor fitting 24 through the duct 17 and perpendicularly from the flange side of the duct, being provided at its end remote from the housing with an outwardly extending, annular flange 33 which rests upon the flange boss 12 of the engine intake manifold 11 and is secured to the flange of the intake manifold boss by cap screws as indicated at 34. The conduit 31 communicates interiorly thereof with the interior of the housing 28 and is disposed in spaced relationship longitudinally of the duct 17 to the aperture 30 and the carburetor fitting 24.

The conduit 31 communicates interiorly thereof with the interior of the housing 28 near the end wall 32 of the housing and at a location spaced from the aperture 30 and extends through the duct 17 without communication with the interior of the duct.

In the arrangement illustrated the housing 28 and duct 17 are formed in two separable pieces which separate on a plane disposed perpendicular to the longitudinal center line of the housing and the duct and substantially at the midlength location of the longitudinal center line of the housing. Each of these separable parts is preferably provided as an integral casting and outwardly projecting flanges 36 and 37 extend one around each of these separable parts at their open, abutting ends and are apertured to receive screws or bolts, as indicated at 38, which secure the flanges together with a gasket 39 interposed between the abutting faces of the flanges.

Bearing bosses 40 and 41 are provided on the inner sides of the end walls 42 and 32 respectively of the housing and a shaft 43 is journaled in these bearing bosses by bearing structures 44 and 45 disposed in the bosses 40 and 41 respectively. The bearing structures may be either plane bearing bushings or may be anti-friction ball or roller bearings, as may be desired. The shaft 43 has its rotational axis substantially coincident with the longitudinal center line of the housing 28 and projects at one end through an aperture 46 in the end wall 42 of the housing.

A fan 48 is mounted on the shaft 43 between the aperture 30 and the conduit 31 and a hollow, annular ring 50 is formed in the housing between the fan 48 and the aperture 30 to direct the combustible fuel and air mixture entering the housing from the duct 17 through the aperture 30 to the central portion of the fan 48 for movement by the fan into the conduit 31 at an increase in pressure.

The housing is provided with radially projecting and angularly spaced apart nipples 51 and 52 which lead from the interior of the ring 50 to the exterior of the housing, the nipple 52 extending through the duct 17, for connection by flexible hose conduits to the liquid cooling system of the associated engine so that the engine cooling fluid will be continuously forced through the interior of the ring 50 while the engine is in operation constituting the ring 50 a heat exchanger for regulating the temperature of the combustible mixture flowing through the ring to the fan 48.

A portion of the shaft 43 projecting outwardly of the housing end wall 42 is longitudinally splined, as indicated at 53, and a clutch element 54 having a partly conical face is mounted on the splined portion of the shaft and is drivingly connected to the shaft while provided with a limited freedom of longitudinal movement relative to the shaft. An annularly grooved clutch collar 55 is carried by the element 54 in surrounding relationship to the splined portion of the shaft and a clutch controlled fork or ring 56 surrounds the collar 55 in the annular groove in the collar. Outwardly of the splined portion 53 the shaft is provided with a bearing portion 58 and a screw threaded end portion 59 and a clutch cone 60 is journaled on the shaft bearing portion 58 by a suitable bearing structure 61 and carries a belt pulley 62. A nut 63 threaded onto the screw threaded portion 59 of the shaft maintains the clutch cone and pulley structure in operative position on the bearing portion 58 of the shaft and a thrust bearing washer 64 is interposed between the nut 63 and the adjacent face of the pulley 62. A V-belt 65 drivingly connects a rotatable element of the engine 10, such as the engine cooling fan, water pump or generator drive, to the belt pulley 62 so that the belt pulley 62 is continuously rotated while the engine is in operation.

Pivot arms 67 and 68 are pivotally mounted intermediate their length on the outer ends of brackets 70 and 71 projecting outwardly from the housing end wall 42 substantially parallel to the longitudinal center line of the housing and are pivotally connected at their inner ends to the clutch throw-out ring 56.

A yoke 72 is pivotally connected at its ends to the pivot arms 67 and 68 near the outer ends of these arms and a stem 73 extends from the center of the yoke to a location convenient to the operator of the vehicle so that the operator can engage and disengage the clutch at will to place the supercharger in or out of operation.

A drain cock 74 extends through the bottom wall of the duct 17, that is the wall of the duct having the marginal flange 18 thereon, for draining condensate from the interior of the supercharger and a windshield wiper conduit nipple 76 extends from the upper wall of the duct between the carburetor fitting 24 and the adjacent end of the housing 28 for the attachment of a windshield wiper conduit 77 thereto.

A thrust bearing 78 is mounted on the shaft 43 adjacent the outer side of the housing end wall 42 and provides an abutment for a coiled compression spring 80 which surrounds the shaft between the bearing 78 and the adjacent side of the clutch collar 55 to automatically engage the clutch when the yoke 72 is moved in a clutch-engaging direction, and a hollow, annular boss 81 is provided on the outer side of the end wall 42 in surrounding relationship to the shaft 43 and spring 80 to protect the spring and the thrust bearing.

With the engine in operation, when the supercharger is placed in operation by manually engaging the supercharger driving clutch, the supercharger will increase the intake manifold pressure of the associated engine and thus increase the power output of the engine. Also, by regulating the temperature of the combustible charge supplied to the engine by the heat exchanger 50, the engine will operate more efficiently in cold weather when the cold intake charge is heated by the heat exchanger and will also operate more efficiently in very hot weather when the high temperature charge is cooled by the heat exchanger.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An internal combustion engine supercharger comprising an elongated duct having closed ends and adapted to be secured on an internal combustion engine, a fitting on said duct at one end thereof for receiving an engine carburetor and placing the carburetor in communication with the interior of the duct, a closed housing mounted on said duct in spaced relationship to said fitting, said duct having an aperture near the other end thereof providing communication between the interior of said duct and the interior of said housing, a conduit extending from said housing in spaced relationship to said aperture and said fitting and adapted to be connected to an associated engine intake manifold, a shaft extending through and journaled in said housing, a fan on said shaft between said aperture and said conduit, a hollow ring in said housing coaxially surrounding said shaft between said fan and said aperture for directing combustible mixture flowing from said carburetor through said duct into said housing to the central portion of said fan for discharge by said fan through said conduit, conduit means extending from said ring for connecting the interior of said ring to an associated engine cooling system, and means on said shaft outside of said housing for drivingly connecting an associated engine to said shaft.

2. An internal combustion engine supercharger comprising an elongated duct having closed ends and adapted to be secured on an internal combustion engine, a fitting on said duct at one end thereof for receiving an engine carburetor, a closed housing mounted on said duct in spaced relationship to said fitting and communicating interiorly thereof with the interior of said duct, a conduit extending from said housing in communication with the interior thereof through said duct and adapted to be connected to an associated engine intake manifold, a shaft extending through and journaled in said housing, a fan on said shaft within said housing, for drawing combustible mixture from said carburetor through said duct into said housing and expelling the combustible mixture from said housing through said conduit, and shaft driving means mounted on said shaft outside of said housing and including a driving pulley journaled on said shaft and manually operable clutch means mounted on said shaft and drivingly connected thereto for drivingly connecting said belt pulley to said shaft.

3. An internal combustion engine supercharger comprising an elongated duct having closed ends and adapted to be secured on an internal combustion engine, a fitting on said duct at one end thereof for receiving an engine carburetor, a closed housing mounted on said duct in spaced relationship to said fitting and communicating interiorly thereof with the interior of said duct, a conduit extending from said housing in communication with the interior thereof through said duct and adapted to be connected to an associated engine intake manifold, a shaft extending through and journaled in said housing, a fan on said shaft within said housing, for drawing combustible mixture from said carburetor through said duct into said housing and expelling the combustible mixture from said housing through said conduit, shaft driving means mounted on said shaft outside of said housing and including a driving pulley journaled on said shaft and manually operable clutch means mounted on said shaft and drivingly connected thereto for drivingly connecting said belt pulley to said shaft, and heat exchange means disposed within said housing and adapted to be connected to the cooling system of an associated engine.

References Cited in the file of this patent

UNITED STATES PATENTS

| 1,400,955 | Jessen | Dec. 20, 1921 |
| 1,651,250 | Brownback | Nov. 29, 1927 |
| 1,930,198 | Hall-Brown | Oct. 10, 1933 |